United States Patent [19]

Benda et al.

[11] Patent Number: 5,173,907
[45] Date of Patent: Dec. 22, 1992

[54] MODELOCKED HIGH POWER LASER HAVING AN ADJOINT FEEDBACK BEAM

[75] Inventors: John A. Benda, Amston; Paul R. Blazsuk, Lebanon; Gary E. Palma, Bloomfield, all of Conn.

[73] Assignee: United Technologies Corporation, Hartford, Conn.

[21] Appl. No.: 780,898

[22] Filed: Oct. 23, 1991

[51] Int. Cl.$^5$ .................. H01S 3/098; H01S 3/08
[52] U.S. Cl. .................. 372/18; 372/19; 372/20; 372/25; 372/95; 372/97; 372/99
[58] Field of Search .................. 372/18, 19, 20, 25, 372/34, 95, 96, 97, 98, 99

[56] References Cited

U.S. PATENT DOCUMENTS

| | | | |
|---|---|---|---|
| 3,808,552 | 4/1974 | Baues | 372/97 |
| 3,921,096 | 11/1975 | Chenausky et al. | 372/18 X |
| 4,025,172 | 5/1977 | Freiberg | 372/97 X |
| 4,127,826 | 11/1978 | Cason, III | 372/19 |
| 4,682,339 | 7/1987 | Sziklas et al. | 372/18 X |
| 4,803,696 | 2/1989 | Pepper et al. | 372/96 |
| 4,841,541 | 6/1989 | Sziklas et al. | 372/97 X |
| 4,907,237 | 3/1990 | Dahmani et al. | 372/18 X |

OTHER PUBLICATIONS

M. N. Kong, J. K. Chee and J. M. Liu, Passive Mode Locking with a Nonlinear External Coupled Cavity at High Pulse Repetition Rates, OPTICS LETTERS, vol. 16, No. 2, Jan. 15, 1991.

A. E. Siegman, Orthogonality Properties of Optical Resonator Eigenmodes, OPTICS COMMUNICATIONS, vol. 31, No. 3, Dec. 1979.

*Primary Examiner*—Brian Healy
*Attorney, Agent, or Firm*—McCormick, Paulding & Huber

[57] ABSTRACT

A modelocked laser with an unstable resonator configuration is described. The laser relies on adjoint mode feedback with a modulator in the low power feedback beam path which is not part of the main resonator. The optical cavity length and the path length of the feedback beam are adjusted to provide a pulsed, modelocked output beam.

9 Claims, 4 Drawing Sheets

MODELOCKED HIGH POWER LASER HAVING AN ADJOINT FEEDBACK BEAM

TECHNICAL FIELD

The present invention relates generally towards lasers and more particularly towards modelocked high powered lasers having an adjoint feedback beam.

CROSS REFERENCE TO RELATED APPLICATIONS

Some of the subject matter hereof is disclosed and claimed in the following commonly owned, copending U.S. patent applications which are incorporated herein by reference: "A High Powered Laser With Reduced Optical Aberration", U.S. Ser. No. 07/781,771, pending; "A High Power Laser, Having Staged Laser Adjoint Pulsed Feedback", U.S. Ser. No. 07/780,897, pending; "Optically Pulsed Laser Having Coupled Adjoint Beams", U.S. Ser. No. 07/780,637, pending; "Pulsed Ring Lasers Using Adjoint Coupling Control" U.S. Ser. No. 07/781,431, pending; "Optically Pulsed Laser" U.S. Ser. No. 07/781,430, pending; "Linear Polarization Control of High Power Lasers", U.S. Ser. No. 07/781,426, pending; "Improved Linear Polarization Control of High Power Lasers", U.S. Ser. No. 07/781,427, pending; and "Circular and Elliptical Polarization of a High Power Laser by Adjoint Feedback", U.S. Ser. No. 07/781,428, pending.

BACKGROUND OF THE INVENTION

High powered lasers used for welding or drilling are well known in the art. Typically, these lasers, such as the 14 kilowatt model laser marketed by the Industrial Laser Division of United Technologies Corporation, are of the transverse electrode, convective flow type. In these lasers, large volumes of carbon dioxide gas or an equivalent gaseous lasing medium are flowed through a region of opposed electrodes. A gas discharge is created between the electrodes, creating the population inversion that is needed to generate a high powered, coherent beam.

Adjoint feedback has been found to be a way of controlling the operation of a laser. Adjoint feedback consists of taking a portion of the output of a laser and retroreflecting it back into the adjoint mode (the converging wave) of the resonator or, in the case of coupling, injecting it into the adjoint mode of another laser. The advantage of using an adjoint feedback beam is that it is a small low power beam which is not part of the main resonator. Optics in the adjoint feedback beam can be readily changed or rotated.

Pulsing of high power industrial lasers has a number of potential applications, such as paint stripping. The potential for suppression of the plasma which forms on a metal target also may give improved welding, hole drilling, and cutting performance. Also, the higher peak power which is potentially achievable with pulsed operation may allow welding and cutting of metals which are now difficult, such as aluminum and copper. A technique for Q-switching using adjoint feedback beam with an unstable resonator is disclosed and claimed in the copending, commonly owned U.S. patent application entitled "Optically Pulsed Laser", U.S. Ser. No. 07/781,430, pending filed on Oct. 23, 1991 and incorporated herein by reference. Modelocking is another means of pulsing known lasers. With existing lasers it achieves much shorter pulse lengths and much higher repetition rates than does Q-switching. Also, efficiency is higher since there are no periods when the gain medium is not being used. As with Q-switched lasers, traditional approaches for modelocking require the insertion of a modelocker such as a standing wave modulator or saturable absorber into the resonator. These are impractical because the large powers of the present type lasers would damage or destroy the components.

It would be advantageous to have a high powered laser of the aforementioned type characterized by adjoint feedback that is capable of modelocked operation. The present invention is drawn towards such a laser.

SUMMARY OF THE INVENTION

An object of the present invention is to provide a laser having adjoint beam feedback whose output beam is characterized by locked longitudinal modes.

According to the present invention, a laser includes an optical cavity disposed along an optic axis having therein an optical beam composed of longitudinal modes each with a mode phase, the optical cavity further having optical losses. An excitation means is configured with the optical cavity and provides a gain medium located in said optical cavity with excitation signals to generate optical gain in an optical beam therein such that a plurality of the longitudinal modes exceed a lasing threshold. A resonator assembly is positioned within the optical cavity and includes a first cavity mirror positioned at a first end of the optical cavity, a scraper mirror is positioned within the cavity to receive the optical beam transiting therein and to turn a portion of the optical beam outward from the optical cavity. The scraper mirror further has a central aperture along the optic axis and a feedback aperture displaced from the optic axis about a feedback axis. A second cavity mirror is located opposed to the first mirror at a second end of the optical cavity along the optic axis and is registered with the central aperture to reflect the optical beam within said optical cavity. A feedback mirror is located along the feedback axis and reflects a feedback beam transiting between the feedback mirror and the first optical cavity mirror. A modelocking apparatus is positioned along the feedback axis to receive the feedback beam and provide, in response to control signals, a perturbation in the optical cavity losses as the optical beam transits the optical cavity allowing the optical cavity losses to be lower when longitudinal modes above threshold in the cavity are phase locked so as to produce a pulse circulating therein.

DESCRIPTION OF THE PREFERRED EMBODIMENT

Figure 1:
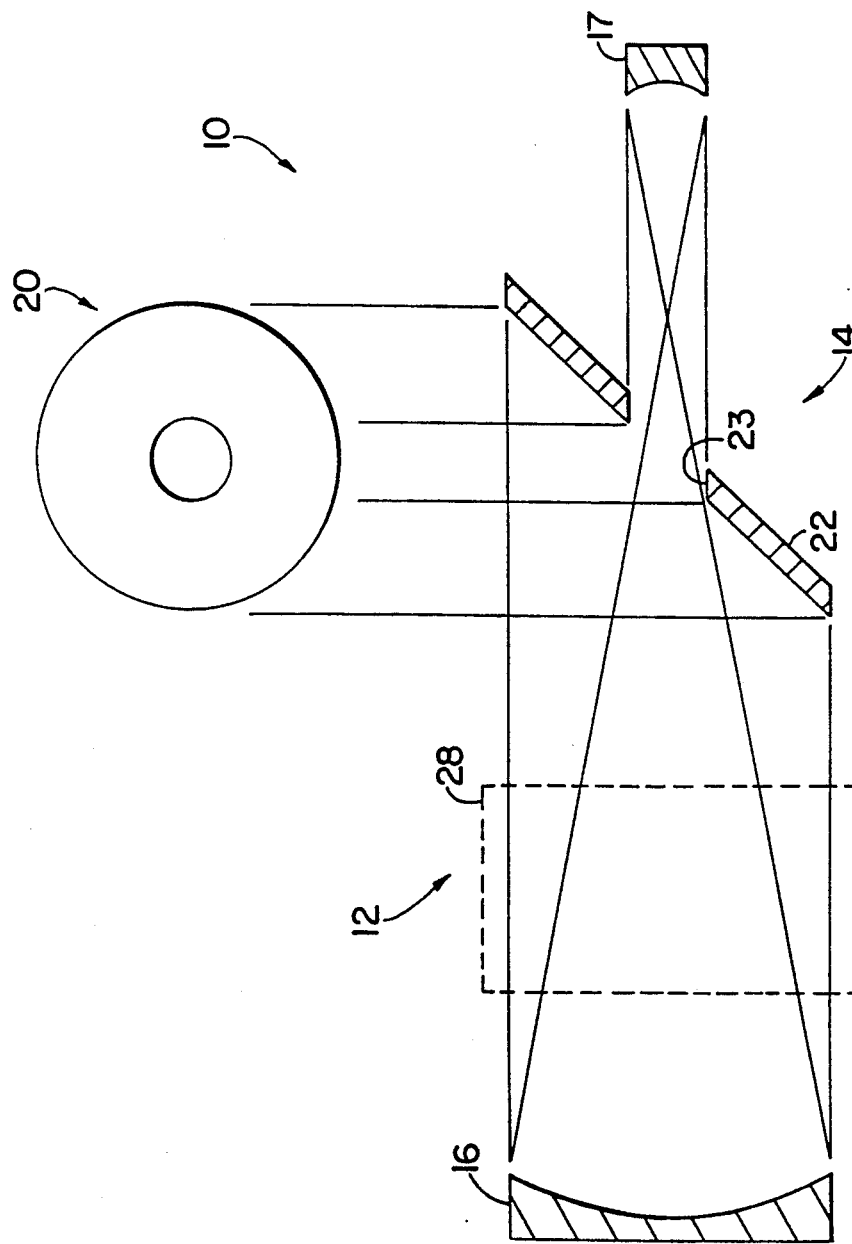
FIG. 1 is a simplified schematic illustration a modelocked high powered laser of the prior art.

FIG. 1 is a simplified illustration showing a laser having an adjoint beam feedback. The laser 10 is comprised of a resonator assembly 12 that bounds an optical cavity 14. The resonator assembly includes primary cavity mirrors 16 and 17. A collimated output beam 20 is presented from the laser by a scraper mirror 22. The scraper mirror has a central aperture 23 allowing the optical beam to transit between the cavity mirrors. The resonator assembly shown in laser 10 is of the negative branch, unstable confocal resonator type.

In the past, attempts to generate a pulsed output beam by Q switching or modelocking required the insertion of an apparatus 28 into the resonator assembly to intercept the optical beam within the assembly to selectively control cavity loss. For modelocked lasers, a passive modelocker can be inserted in the optical cavity such as a standing wave modulator in a material (i.e. germanium) or a saturable absorber such as sulfur hexaflouride (SF6). Unfortunately, for high power applications the simple insertion of a modelocker into the main resonator assembly is unacceptable because of the high flux that will be seen by the modelocking element. Consequently, prior art devices have an inherent upper bound to their output power.

Figure 2:
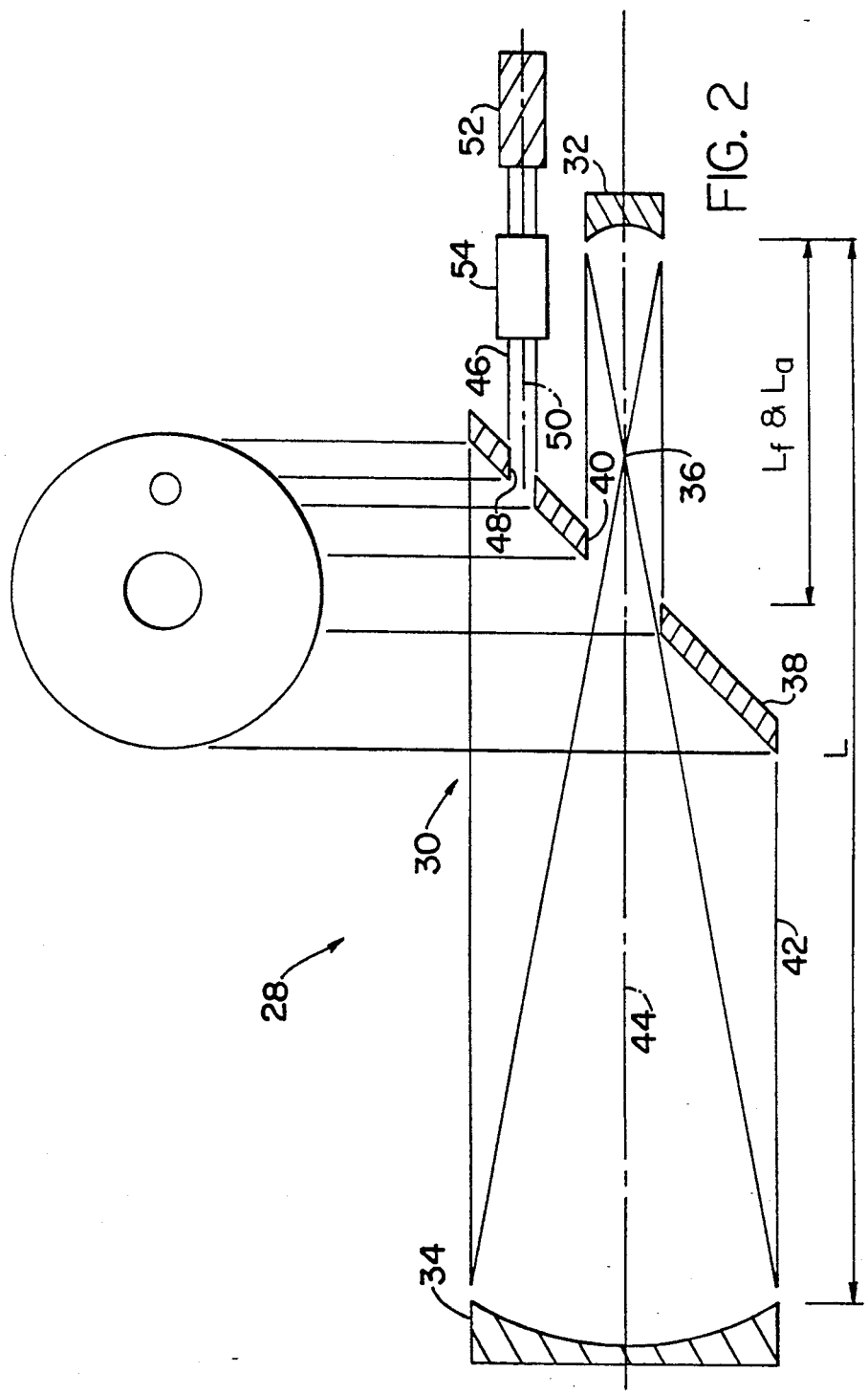
FIG. 2 is a simplified illustration of a laser provided by the present invention.

Referring now to FIG. 2, there is shown a high powered laser 26 provided in accordance with the present invention. The laser is characterized by an adjoint feedback beam and displays modelocked operation. The laser employs a confocal unstable resonator assembly 30 of the negative branch type. The resonator assembly is comprised of cavity mirrors 34 and 32 whose foci (f) 36 substantially coincide and are located within the cavity. Those skilled in the art will note that other resonator assembly geometries, such as a positive branch confocal unstable resonator assembly may be equivalently substituted.

The gain medium (not shown) in the optical cavity used with the laser 26 is typically a gas, such as a known mixture of carbon dioxide, nitrogen and helium. Those skilled in the art will recognize that other gain media can be equivalently substituted and a variety of electrode configurations can be used depending upon the power output and other desired laser parameters. The laser 26 can operate continuously (CW) in a known manner. A description of known components, such as the electrodes for gas excitation, have been omitted for purposes of clarity. Further, those skilled in the art will note that the present invention includes lasers having a non-gaseous gain medium, such as solid state lasers. For high power gas lasers, large volumes of gas (i.e. a mixture of carbon dioxide, helium and nitrogen) are flowed at very high velocities (approximately 0.3 Mach) through the laser cavity in a direction into the plane of FIG. 2. This configuration produces high power, in excess of 1000 watts.

The laser 26 also includes a scraper mirror 38 having a central aperture 40 for passing a cavity beam 42 between the cavity mirrors along an optic axis 44. The laser 26 is characterized by a feedback beam 46 passed through feedback aperture 48 along a feedback axis 50 to an adjoint feedback mirror 52.

The feedback beam is reflected back to the resonator assembly 30 in a particular configuration of a direction phased distribution such that it is mode matched to the adjoint mode of the resonator. A definition of "adjoint mode" is given in "Orthogonality Properties of Optical Resonator Eigenmodes", Optics Comm., Vol. 31, pp. 369–373, Dec. 1979. The reflected radiation walks into the axis of the resonator, making several passes before diffractively spreading and contributing to resonator loss or output. The effect of this is to reduce the resonator loss more than by other means of injecting the feedback beam, thus allowing a low power beam to have a large effect.

The output beam is collimated so it is necessary simply to retroreflect the output beam with a flat mirror. For non-collimated output, a curved mirror will be necessary to mode match the adjoint mode of the resonator. In general, the compound resonator eigenvalue $\gamma c$ for a resonator assembly is given approximately by $$\gamma c = \frac{1}{M} + \frac{A_c}{\lambda f_1} \quad (1)$$

where $A_c$ is the area of the adjoint feedback aperture area being for the feedback beam; $\lambda$ is the laser wavelength and $f_1$ is the focal length of the cavity mirror 34. The first term in equation (1) is the contribution of the parent resonator self-feedback to the eigenvalue and the second term is the contribution of the feedback of the adjoint beam. The power feedback is proportional to $$\gamma c = \frac{1}{M_2} + \frac{2A_c}{\lambda M f_1} + \frac{A_c}{\lambda f_1} \quad (2)$$

The equivalent or compound resonator has a feedback value that is greater than the parent resonator. The third term in equation (2) is often negligible. Since the cavity loss is proportional to $(1-\gamma^2)$, the change in $\gamma$ above means that the cavity loss has substantially decreased and therefore, for these operating conditions, that the circulating power has substantially increased.

The "leverage" effect from the use of adjoint feedback rather than non-adjoint feedback results from the fact that, in this type of unstable resonator, the adjoint is converging down to the resonator axis so that the radiation fed back in from the adjoint feedback beam makes several passes through the resonator, before spreading diffractively and contributing to the resonator losses, as it is reflected between the cavity mirrors 32 and 34. The adjoint feedback power thus makes many more passes through the gain medium than would non-adjoint feedback power would before significant loss occurs.

The present invention is characterized by a modelocker in the adjoint feedback path. Disposed between the feedback mirror and the scraper mirror aperture is a modelocker 54, such as a saturable absorber, i.e., sulfur hexaflouride (SF6), or a standing wave modulator in a material such as germanium. Modelockers work by allowing the cavity losses to be lower when the longitudinal modes above threshold in the cavity are phase locked so as to produce a pulse circulating therein. Modelocking will occur if the length from the scraper mirror to the adjoint feedback mirror (La) is adjusted to be the same as the distance from the scraper to the self feedback mirror in the main resonator (Lf) plus some multiple of L, the length of the main resonator. The pulse repetition rate will be c/2L. The pulse repetition rate should be N (c/2L) if La is adjusted to be Lf+(M/N) L, where M and N are positive integers with no common divisor.

- A high power $CO_2$ industrial laser provided according to the present invention configured with a cavity length of 10 m and a total gas pressure in the discharge of 100 torr has a gain profile width of about 300 MHz, while the longitudinal mode spacing is 15 MHz. Thus, the output beam is comprised of a series of pulses each of about 20 longitudinal modes. For a laser where La is adjusted to be the same as Lf, the repetition rate will be 15 MHz, the pulse length will be about 3.3 nsec or 1/20th of the cavity transit time, the peak power will be about 20 times the CW power.

Figure 3:
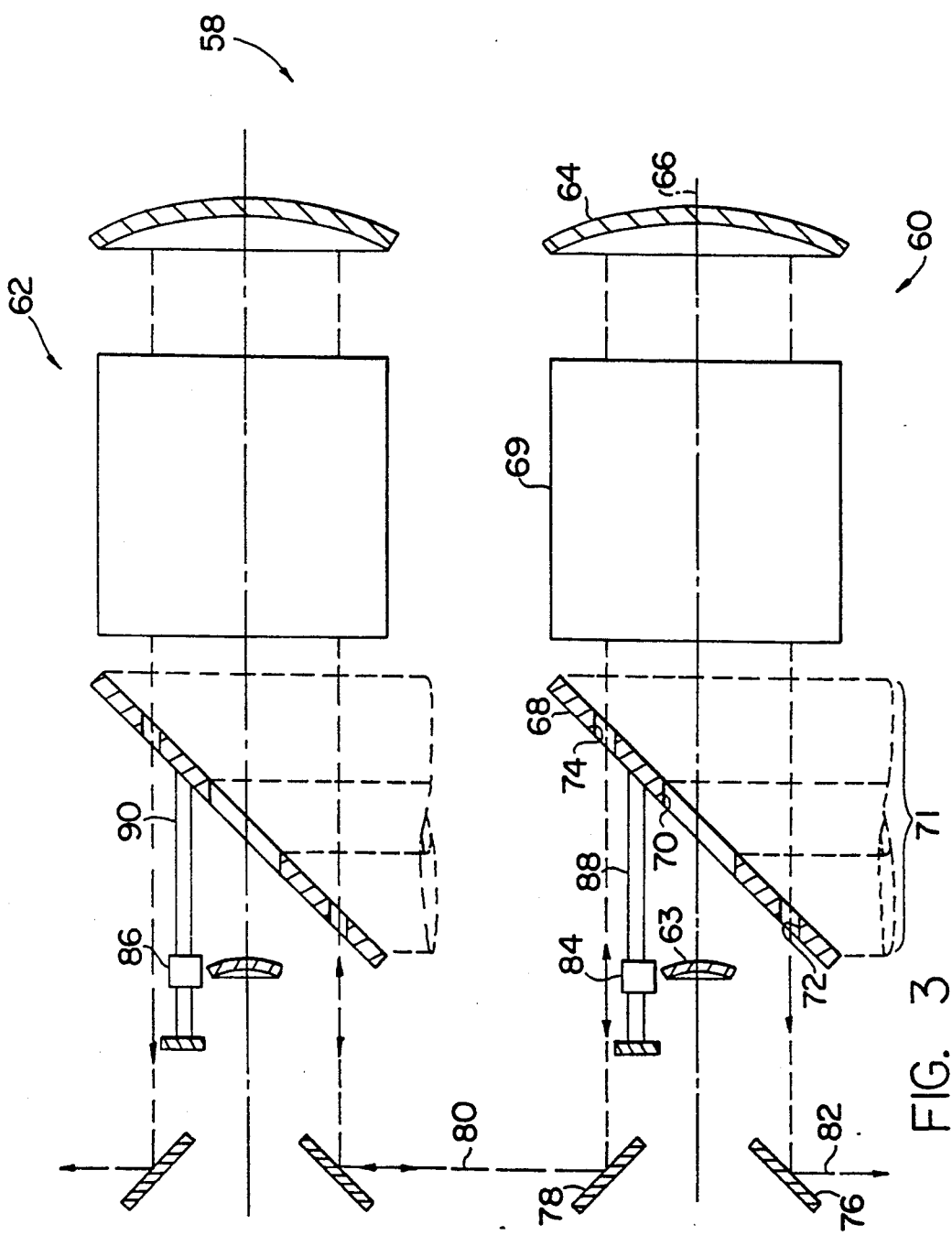
FIG. 3 is a simplified schematic illustration of a second laser provided according to the present invention.

FIG. 3 is a simplified schematic illustration of a first alternative laser 56 provided by the present invention. The first alternative laser comprises an array 58 of two unstable resonators 60 and 62. Resonator 60 further comprises a convex mirror 63, concave mirror 64 placed along axis 66 with an output coupling or scraper mirror 68. The means for pumping the gaseous lasing medium, flow apparatus and other aspects of the laser are conventional and are not shown for purposes of illustrative clarity. A laser array of the type described with respect to FIG. 3 is disclosed in claim in the commonly owned U.S. Pat. No. 4,682,339 and incorporated herein by reference. The second resonator 62 is identical to the first.

Within the central portion of the resonator 60, close to the axis 66, the radiation between the mirrors diverges gradually until it produces a collimated beam having a diameter of the concave mirror that is deflected by a scraping mirror 68. A gain medium shown schematically at 69 is also included. The scraping mirror is a conventional mirror having a central aperture 70 sized to fit the convex mirror. Radiation diverging from the concave mirror will strike the back side of the scraper mirror and be deflected out of the cavity at 71. Additional output coupling apertures 72, 74 are provided in the scraper mirror. Each of these apertures permits a small portion of the collimated output beam, which serves as coupling beams, to pass through the mirror and be deflected by turning mirrors 76 and 78. Beam 80 is coupled into the resonator 62 and beam 82 is coupled into an adjacent resonator above the resonator 60 and not shown in the figure.

The laser 56 is characterized by modelockers 84, 86 located in feedback beams 88, 90. The optical pathlength of the beams are adjusted by the position of the mirrors in the same manner as set forth hereinabove with respect to the laser of FIG. 2. In this manner, the laser array 58 provides coupled, mode-locked output beams. Alternatively, the modelockers can be placed in path 90.

Figure 4:
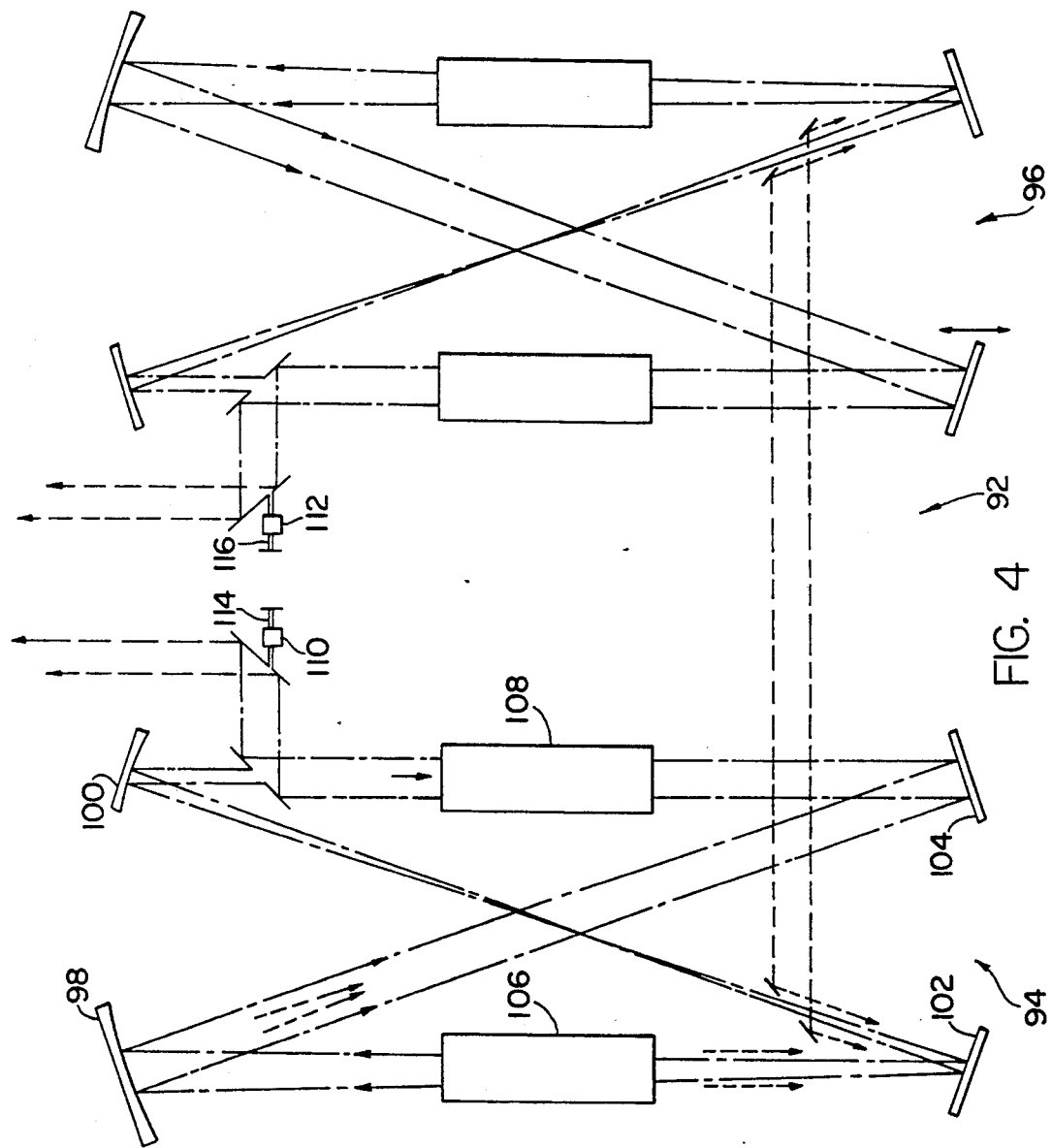
FIG. 4 is a simplified schematic illustration of a third laser provided according to the present invention.

FIG. 4 schematically illustrates a second alternative laser 92 provided in accordance with the present invention. The laser 92 comprises a pair of ring laser resonators 94 and 96 of the type disclosed and claimed in the commonly owned U.S. Pat. No. 4,841,541 and incorporated herein by reference. As detailed therein, radiation is generated into conventional modes, the forward mode and the reverse mode. The forward mode is collimated between a first curved mirror 98 and a second curved mirror 100. Flat mirrors 102 and 104 complete the basic set of mirrors. Gain media 106 and 108 provide optical gain to the beams circulating therein.

Resonator 96 is a mirror image of the aforementioned resonator with the difference that a flat mirror is manually adjustable in order to correct the path length of the resonator 96 to match that of resonator 94. The optical beams and the paths through which they traverse as well as the coupling between the resonators of the ring laser is accomplished in the manner as described in the '541 patent references above. The laser 92 is characterized by modelockers 110 and 112 positioned within feedback beams 114 and 116 of the respective resonators and operate in the same manner as described hereinabove with respect to the laser of FIG. 2.

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A laser, comprising:
   an optical cavity disposed along an optic axis having therein an optical beam composed of longitudinal modes each with a mode phase, said optical cavity further having optical losses;
   an excitation means for communicating excitation signals to said optical cavity;
   a gain medium located in said optical cavity for receiving said excitation signals and for providing optical gain to said optical beam such that a plurality of said longitudinal modes exceed lasing threshold; and
   a resonator assembly positioned within said optical cavity including
   a first cavity mirror positioned at a first end of the optical cavity;
   a scraper mirror positioned within said optical cavity to receive an optical beam transiting therein and to turn a portion of said optical beam outward from said optical cavity, said scraper mirror having a central aperture along said optic axis and a feedback aperture displaced from said optic axis about a feedback axis;
   a second cavity mirror opposed to said first mirror at a second end of the optical cavity along said optic axis registered with said central aperture configured to reflect said optical beam within said optical cavity;
   a feedback mirror located along said feedback axis for reflecting a feedback beam transiting between said feedback mirror and said first optical cavity mirror; and
   a modelocking means positioned along said feedback axis to receive said feedback beam and provide, in response to control signals, a perturbation in said optical cavity losses as said optical beam transits said optical cavity allowing said optical cavity losses to be lower when longitudinal modes above threshold in the cavity are phase locked so as to produce an optical pulse circulating therein.

2. The laser of claim 1 wherein said first cavity mirror has a focus located along said optic axis inside said optical cavity and wherein said second mirror has a focus substantially at said first mirror focus; said first and second mirrors configured to invert said optical beam transiting therebetween.

3. The laser of claim 1 wherein said first cavity mirror has a focus located along said optic axis outside of said optical cavity and wherein said second mirror has a focus substantially at said first cavity mirror focus.

4. The laser of claim 1 wherein said gain medium is a gas comprised of one or more of the gases from the group consisting essentially of carbon dioxide, nitrogen and helium.

5. The laser of claim 4 wherein said laser is of the transverse electrode convective flow type.

6. The laser of claim 5 wherein said cathode electrode further comprises a series of "L" shaped elements extending into said gas.

7. The laser of claim 5 wherein said gas is flowed between said electrodes at a velocity of approximately Mach 0.3.

8. A laser comprising:
a first ring laser resonator having a first gain medium means for establishing an inverted population state in a first gain medium;
a first set of mirrors in a ring configuration for resonating, in predetermined radially diverging forward and reverse modes and predetermined radially converging adjoint reverse and adjoint forward modes, radiation in a first ring path passing through said gain medium, said radiation in said forward and adjoint forward modes travelling in a predetermined forward direction about said ring path and said radiation in said reverse and adjoint reverse modes travelling about said first ring path in a reverse direction opposite to said forward direction, said adjoint forward mode being adjoint to said forward mode and said adjoint reverse mode being adjoint to said reverse mode;
first outcoupling means for extracting radiation travelling in said forward mode in said first ring path from said first ring path;
internal coupling means for coupling a predetermined coupling fraction of said radiation in one of said forward and reverse modes into a first predetermined radially converging mode adjoint to the other of said forward and reverse modes and travelling about said first ring path in a direction opposite to that of said one of said forward and reverse modes, whereby said radiation in said first predetermined radially converging mode converges radially and couples into said other of said forward and reverse modes;
means for coupling into said ring path a second predetermined amount of external coupling radiation into a predetermined radially converging mode adjoint to said one of said forward and reverse modes, whereby said external coupling radiation into a predetermined radially converging mode adjoint to said one of said forward and reverse modes, whereby said external coupling radiation converges radially and couples in phase said one of said forward and reverse modes and said one of said forward and reverse modes, so that all of said predetermined modes of said ring laser resonator are coupled in phase to said external coupling radiation;
a one of said first set of mirrors having a feedback aperture for receiving a portion of said radiation in said first and second modes and providing therethrough a feedback beam along a feedback axis;
a feedback mirror located along said feedback axis for reflecting said feedback beam from said feedback mirror; and
a modelocking means positioned along said feedback axis to receive said feedback beam and provide, in response to control signals, a perturbation in said optical cavity losses as said optical beam transits said optical cavity allowing said optical cavity losses to be lower when longitudinal modes above threshold in the cavity are phase locked so as to produce an optical pulse circulating therein.

9. A laser having at least two independently pumped unstable laser resonators, each having a feedback region in which optical radiation resonates, an output region in which output radiation exits from said output region in which output radiation exits from said feedback region and an output coupling means for coupling out a main beam from said output region in which laser extracted radiation extracted from a first one of said at least two unstable laser resonator influences said at least one other unstable laser resonator, wherein the improvement comprises a system in which each of said resonators is mutually and substantially symmetrically, bidirectionally coupled to said at least one other unstable resonator, through extraction means for extracting at least one coupling portion of said output radiation having, in total, a coupling radiation power and transporting means for transporting said at least one coupling portion of said output radiation that is mode-matched to an adjoint mode of said at least one other unstable laser resonator into at least one corresponding output region of said other one of said at least two unstable laser resonators to produce a laser system having a scaled-up laser output, each of said resonators further having a feedback means associated with said extraction means including a mirror having a feedback aperture for receiving a portion of said radiation and providing therethrough a feedback beam along a feedback axis with a feedback mirror located along said feedback axis for reflecting said feedback beam and a modelocking means positioned along said feedback axis to receive said feedback beam and provide, in response to control signals, a perturbation in said optical cavity losses as said optical beam transits said optical cavity allowing said optical cavity losses to be lower when longitudinal modes above threshold in the cavity are phase locked so as to produce an optical pulse circulating therein.

* * * * *